(12) United States Patent
Wada

(10) Patent No.: US 6,175,640 B1
(45) Date of Patent: Jan. 16, 2001

(54) FINGERPRINT COMPARING APPARATUS

(75) Inventor: Takuya Wada, Kanagawa (JP)

(73) Assignee: Sony Corporation, Tokyo (JP)

( * ) Notice: Under 35 U.S.C. 154(b), the term of this patent shall be extended for 0 days.

(21) Appl. No.: 09/010,907

(22) Filed: Jan. 23, 1998

(30) Foreign Application Priority Data

Jan. 30, 1997 (JP) .................................................. 9-016044

(51) Int. Cl.$^7$ .............................. G06K 9/00; G06K 9/62
(52) U.S. Cl. ......................... 382/124; 382/209; 382/218
(58) Field of Search .................................. 382/151, 149, 382/124, 168, 209, 217–220, 125; 348/87

(56) References Cited

U.S. PATENT DOCUMENTS

| | | | |
|---|---|---|---|
| 4,057,845 | * 11/1977 | Ejiri et al. | 364/200 |
| 4,334,241 | * 6/1982 | Kashioka et al. | 358/107 |
| 5,177,792 | * 1/1993 | Morita | 382/124 |
| 5,568,564 | * 10/1996 | Ozaki | 382/149 |

* cited by examiner

Primary Examiner—Bhavesh Mehta
(74) Attorney, Agent, or Firm—Ronald P. Kananen; Rader, Fishman & Grauer

(57) ABSTRACT

An image collating apparatus, e.g. a fingerprint comparing apparatus, is enabled to obtain reliable collation results with a simple configuration. A plurality of areas cut out of 1 image to be processed is caused to scan another image to detect the distributions of the degrees of coincidence; these distributions of the degrees of coincidence are corrected with the positional relationship among the areas; the corrected distributions are summed up; and the coincidence or non-coincidence between the two images is judged on the basis of the resultant sum of the distributions of the degrees of coincidence

21 Claims, 15 Drawing Sheets

FIG. 6

| ID | | |
|---|---|---|
| | HORIZONTAL DIRECTION REGISTERED DATA DIH0 | X0, Y0 |
| | HORIZONTAL DIRECTION REGISTERED DATA DIH1 | X0, Y1 |
| | ⋮ | ⋮ |
| | HORIZONTAL DIRECTION REGISTERED DATA DIH4 | X0, Y4 |
| | ⋮ | ⋮ |
| | HORIZONTAL DIRECTION REGISTERED DATA DIH8 | X0, Y8 |
| | VERTICAL DIRECTION REGISTERED DATA DIV0 | X0, Y0 |
| | VERTICAL DIRECTION REGISTERED DATA DIV1 | X1, Y0 |
| | ⋮ | ⋮ |
| | VERTICAL DIRECTION REGISTERED DATA DIV4 | X4, Y0 |
| | ⋮ | ⋮ |
| | VERTICAL DIRECTION REGISTERED DATA DIV8 | X8, Y0 |

DI     5

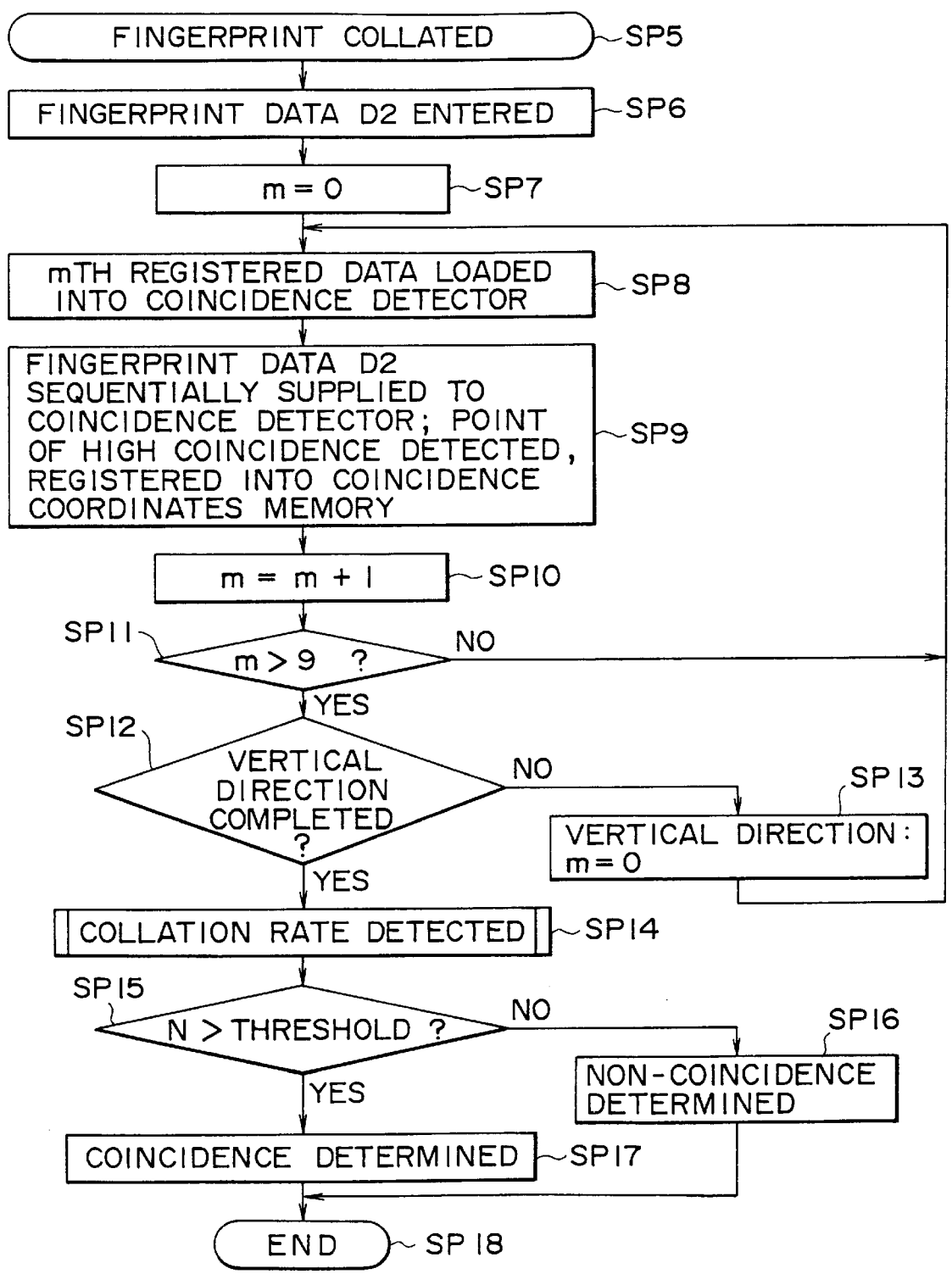
F I G. 14

F I G. 18A
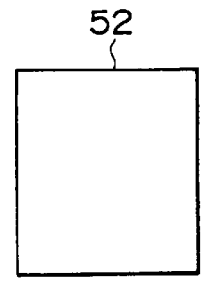
F I G. 18B
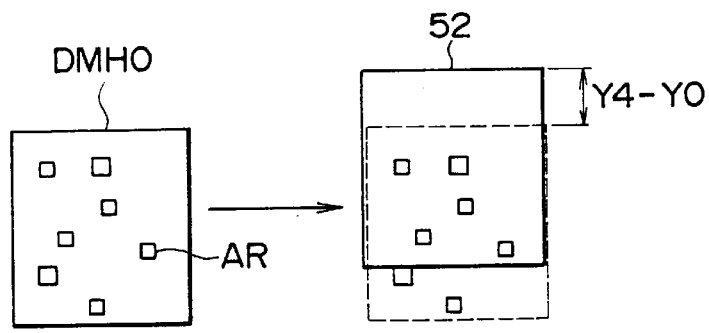
F I G. 18C
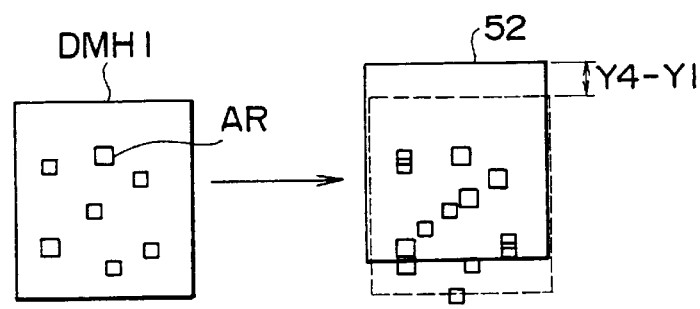
F I G. 18D
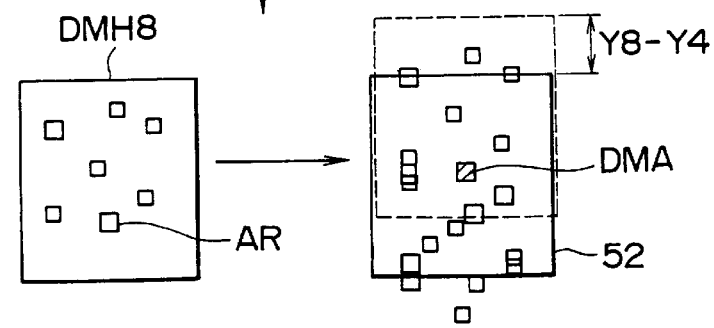

FINGERPRINT COMPARING APPARATUS

BACKGROUND OF THE INVENTION

1. Field of the Invention

The present invention relates to an image collation apparatus, and more particularly to a fingerprint comparing apparatus.

2. Description of the Related Art

Heretofore, in the conventional fingerprint comparing apparatus using an image collation apparatus of this sort, feature points such as a branch, point and cut (hereinafter referred to as "feature point(s)") are extracted from a fingerprint image obtained by means of an image pick-up device, and fingerprint collation is performed with reference to these feature points.

In other words, in the conventional fingerprint collation device, a fingerprint to be collated is incorporated in advance into a database with reference to, for example, feature points and their coordinates. A fingerprint image to be collated is subjected to image processing to extract feature points. Then, the database is accessed with reference to the extracted featured points, and the fingerprint is collated according to the existence or absence of corresponding feature points.

The conventional way of fingerprint collation has the disadvantage that the processing takes a long time. If finger collation can be carried out reliably in a short period of time, the fingerprint collation apparatus can become more convenient and useful.

A conceivable solution to this problem is to cut a linear image out of the fingerprint to be collated, and displace the cut-out linear image sequentially over the reference fingerprint image which has been incorporated into a database to detect the result of comparison. This method, however, takes a long time to process the detected result of comparison, and accordingly involves inadequacy in practical use.

The present invention has been undertaken in view of these problems, and is intended to propose an image collating apparatus which is capable of judging simply and reliably whether or not a given image of fingerprint or the like coincides with a reference image.

SUMMARY OF THE INVENTION

To solve these problems, according to the invention, a plurality of areas cut out of a first image are sequentially displaced over a second image, the degree of coincidence between each area and the second image is sequentially detected with reference to coordinates of the second image, and the distribution of the degrees of coincidence is thereby detected for each area. Then, the coordinates of the distribution of the degrees of coincidence are corrected with the relative positions of a plurality of areas to sum up the distributions of the degrees of coincidence, and whether or not the first image is coincident with the second image is judged from the peak value of this total of the distributions.

As the areas cut out of the first image are sequentially displaced over the second image and the degree of coincidence between each area and the second image is sequentially detected with reference to coordinates of the second image, if the first and second images should essentially coincide with each other, a high degree of coincidence will be detected in each pair of counterpart positions. Elsewhere than pairs of counterpart positions, and even where the first and second images differ from each other, parts of high degrees of coincidence may be detected.

If, with respect to the distribution of the degrees of coincidence prepared from the degrees of coincidence detected in this manner with reference to the coordinates of each pixel of the second image, the coordinates are corrected with the relative positions of a plurality of areas to sum up the distributions of the degrees of coincidence, and if the first and second images should essentially coincide with each other, high degrees of coincidence will be sequentially added in each area for coordinates satisfying the relative positional requirements of the plurality of areas, and high peak values will be detected. Conversely, if the first and second images are different, it will be difficult to detect high peak values either for coordinates satisfying the relative positional requirements of the plurality of areas or for coordinates satisfying no relative positional requirements.

This disposition makes it possible to judge whether or not the image collated is coincident with the reference image according to this peak value, and pass a reliable judgment. The distributions of the degrees of coincidence can be summed up by the easy processing of cumulatively adding the distributions of the degrees of coincidence stored in a memory.

BRIEF DESCRIPTION OF THE DRAWINGS

FIG. 6 is a schematic diagram illustrating the contents of a fingerprint database.

FIG. 14 is a flow chart showing the processing procedure of fingerprint collation.

FIGS. 18A to 18D are schematic diagrams for use in the description of the summing of the distributions of the degrees of coincidence.

DESCRIPTION OF THE PREFERRED EMBODIMENT

Figure 2:
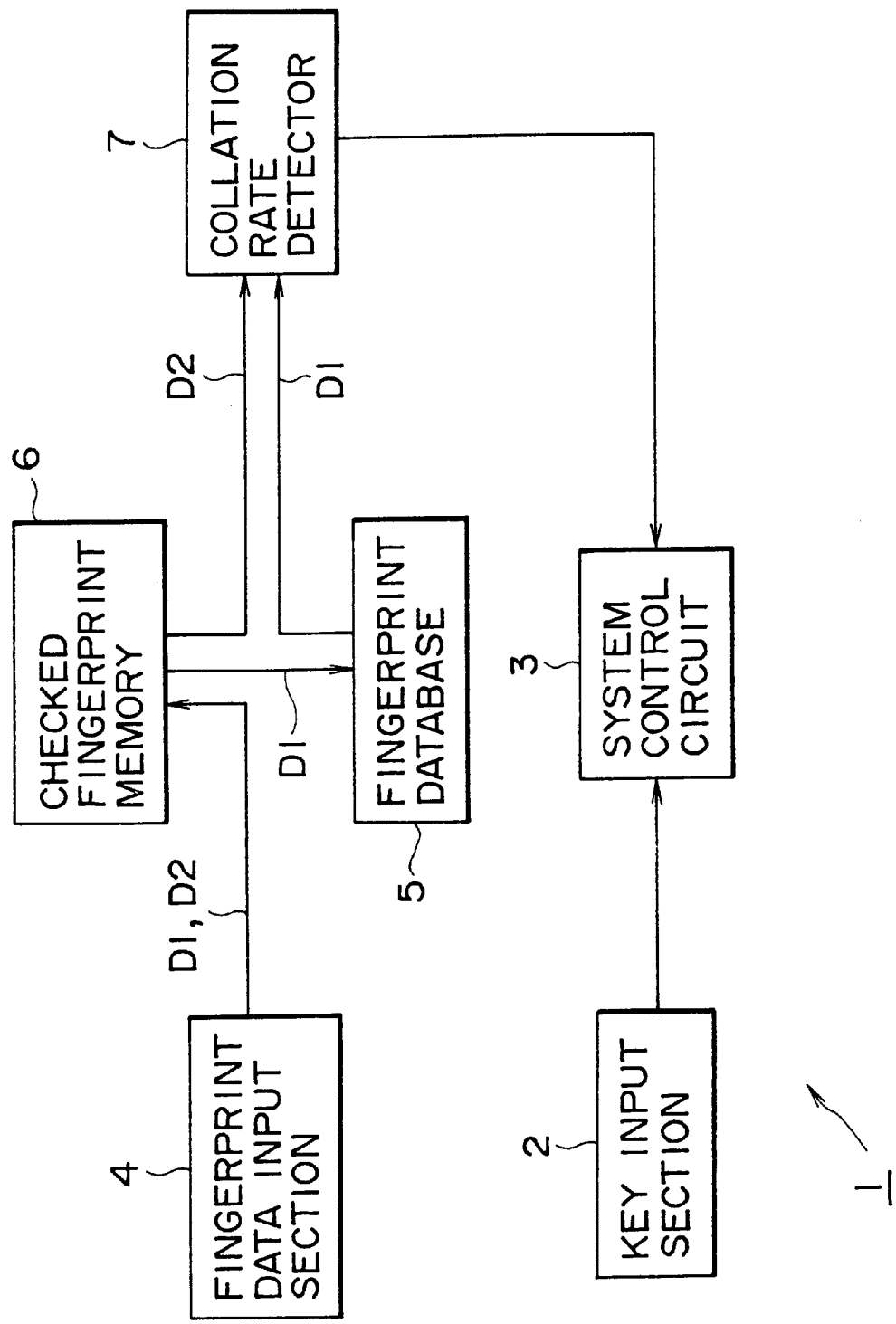
FIG. 2 is a block diagram illustrating the overall configuration of the fingerprint comparing apparatus of FIG. 1.

FIG. 2 is a block diagram illustrating the overall configuration of a fingerprint comparing apparatus which is a preferred embodiment of the present invention. This fingerprint comparing apparatus 1 controls overall operation with a system control circuit 3 in response to the user's manipulation through inputting via a key input section 2. This fingerprint comparing apparatus 1 previously fetches in fingerprint data D1 regarding prescribed users via a fingerprint input section 4, and registers the fingerprint data D1 to build up a fingerprint database 5.

When a user enters a request for fingerprint collation, fingerprint data D2 to be checked are fetched in via the fingerprint data input section 4, and temporarily held in a checked fingerprint memory 6. Further in response to the user's manipulation entered via the key input section 2, the fingerprint data D2 held in the checked fingerprint memory 6 and the corresponding fingerprint data D1 registered in the fingerprint database 5 are entered into a collation rate detector 7. The degree of coincidence between these fingerprint data D1 and D2 is detected, according to which the system control circuit 3 judges whether or not the two fingerprints coincide with each other.

In this manner, the fingerprint comparing apparatus 1 judges whether or not the fingerprint data D1 specified by a user ID entered by the user and the fingerprint data D2 entered via the fingerprint data input section 4 coincide with each other, and accordingly whether or not the user having requested fingerprint collation is the person to be identified.

Figure 3:
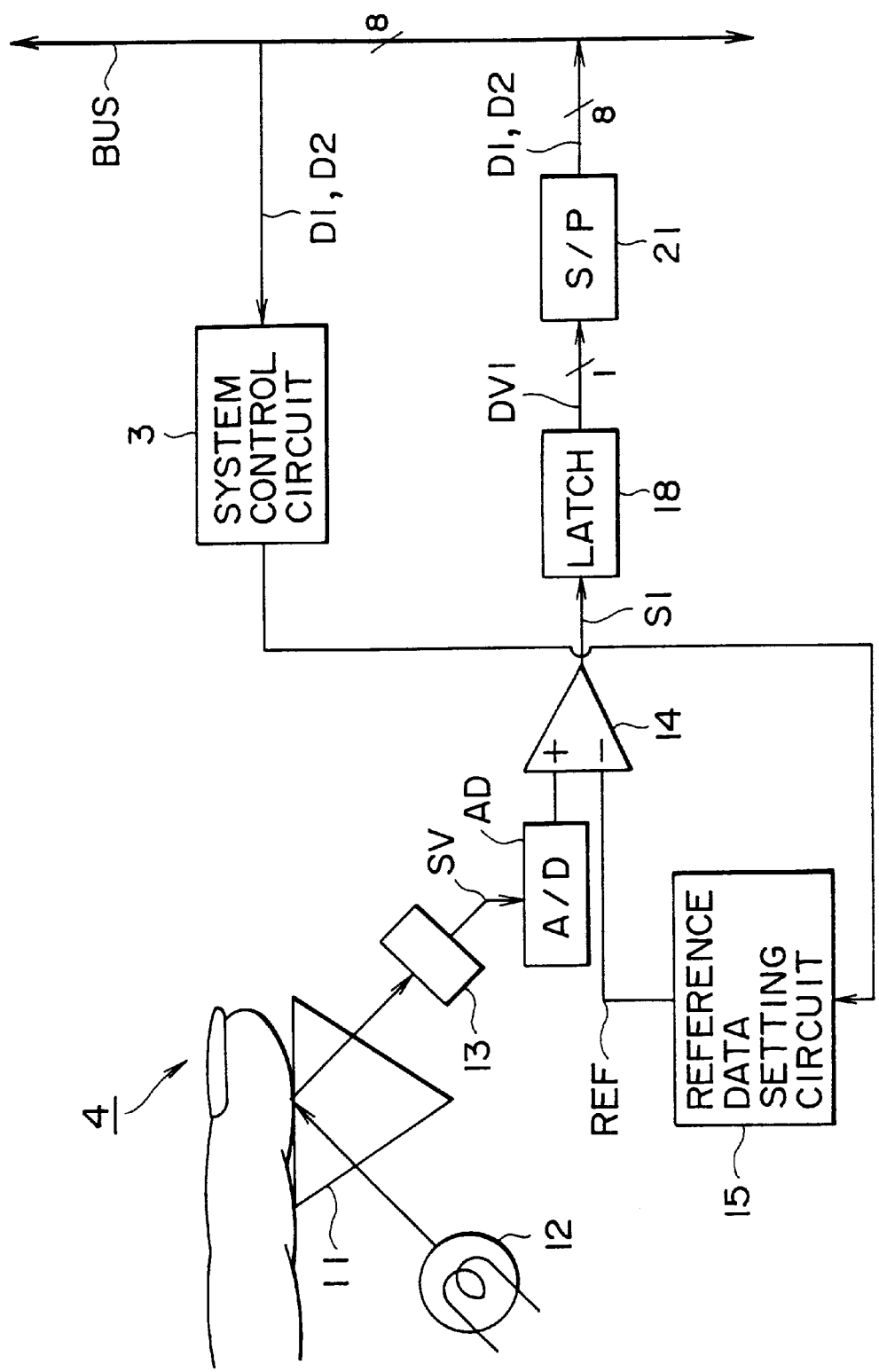
FIG. 3 is a block diagram illustrating the fingerprint data input section of the fingerprint comparing apparatus of FIG. 2.
Figure 4:
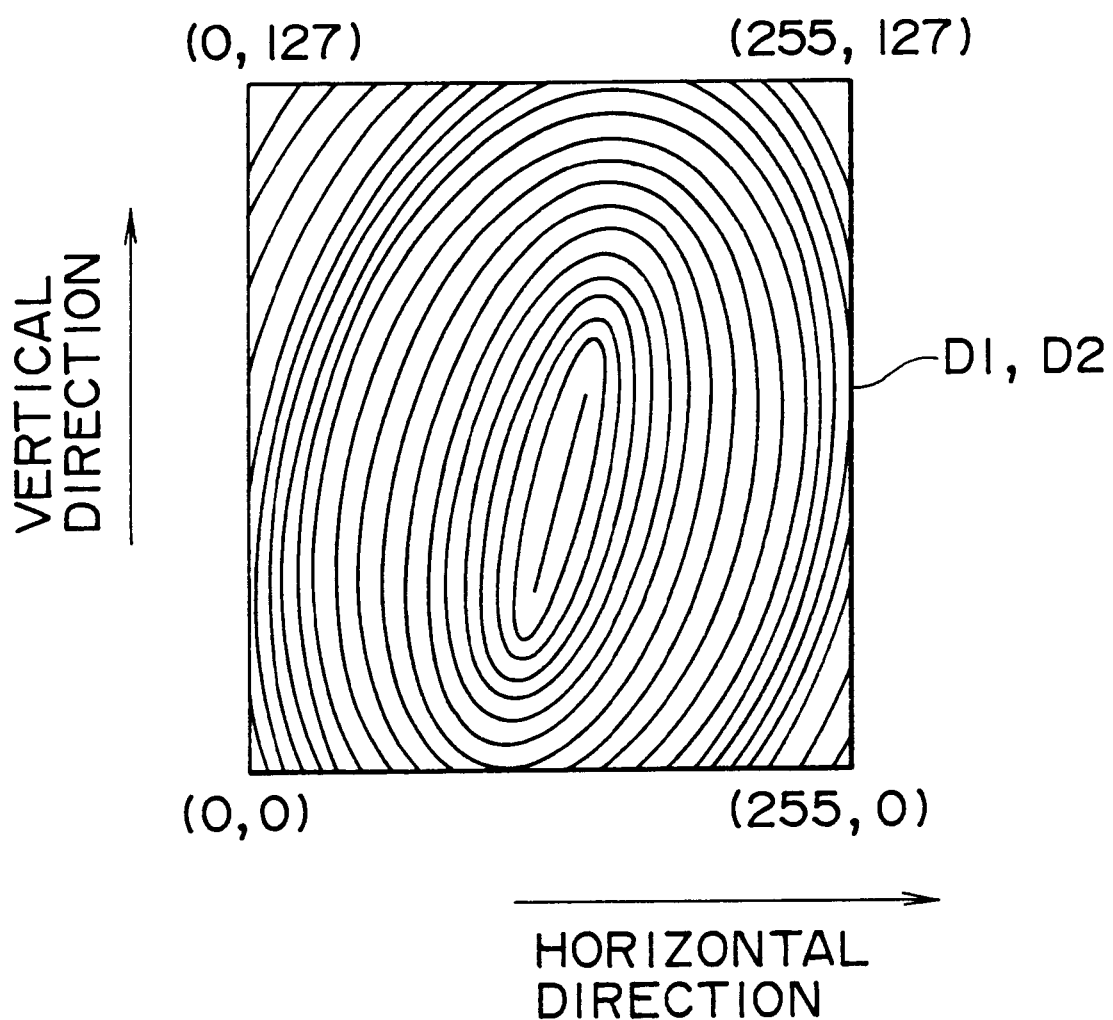
FIG. 4 is a schematic diagram illustrating an image of a fingerprint entered by the fingerprint data input section of FIG. 3.

FIG. 3 is a block diagram illustrating the fingerprint data input section. This fingerprint input section 4 picks up via a prescribed optical system the fingerprint of the user's finger held in a prescribed finger placing position, and generates the fingerprint data D1 and D2 from the picked-up image.

The optical system here comprises an isosceles triangular prism 11 held so as to be able to let the finger whose print is to be picked up be placed on its base, a light source 12 for illuminating the base of this isosceles triangular prism 11 from one of its inclined faces, and a CCD camera 13 for picking up from the other inclined face the illuminating beam from the light source 12 reflected from the base. The light source 12 may consist of a light emitting diode array or the like.

Disposed in this way, the optical system causes the portion of the illuminating beam emitted from the light source 12 irradiating the part of the base of the isosceles triangular prism 11 which is not in contact with the skin to be fully reflected by the base and leads this portion to the CCD camera 13, while, conversely, the other portion of the illuminating beam irradiating the part of the base of the isosceles triangle prism 11 in contact with the skin is irregularly reflected by the base to let virtually no part of the illuminating beam reach the CCD camera 13. As a result, this optical system supplies from the CCD camera 13 an image consisting of bright and dark parts corresponding to the pattern of the fingerprint in the form of a video signal SV.

An analog-to-digital (A/D) converter AD subjects this video signal SV to A/D conversion and supplies a digital video signal. A comparator 14 converts the digital video signal supplied from the A/D converter AD into a binary signal S1 with reference to reference data REF provided by a reference data setting circuit 15, and supplies the binary signal S1. The reference data setting circuit 15 here corrects unevenness in luminous energy of the optical system under the control of the system control circuit 3 and, at the same time, generates the reference data REF to keep the ratio between the bright and dark parts of the fingerprint image at a prescribed level. A latch circuit 18 sequentially latches the output signals of the comparator 14 with a prescribed latch pulse, and supplies 1-bit image data DV1 consisting of the result of latching.

A serial-to-parallel (S/P) converter 21 converts the 1-bit× 8-pixel image data DV1 into 1-byte fingerprint data D1 or D2 by fetching in 8-bit units the image data DV1 supplied from the latch circuit 18, outputs the fetched data intermittently, and supplies the converted data to a data bus BUS. In this manner, the fingerprint data input section 4 supplies a binary fingerprint image consisting of 256 samples in the horizontal direction and 128 samples in the vertical direction.

Figure 5:
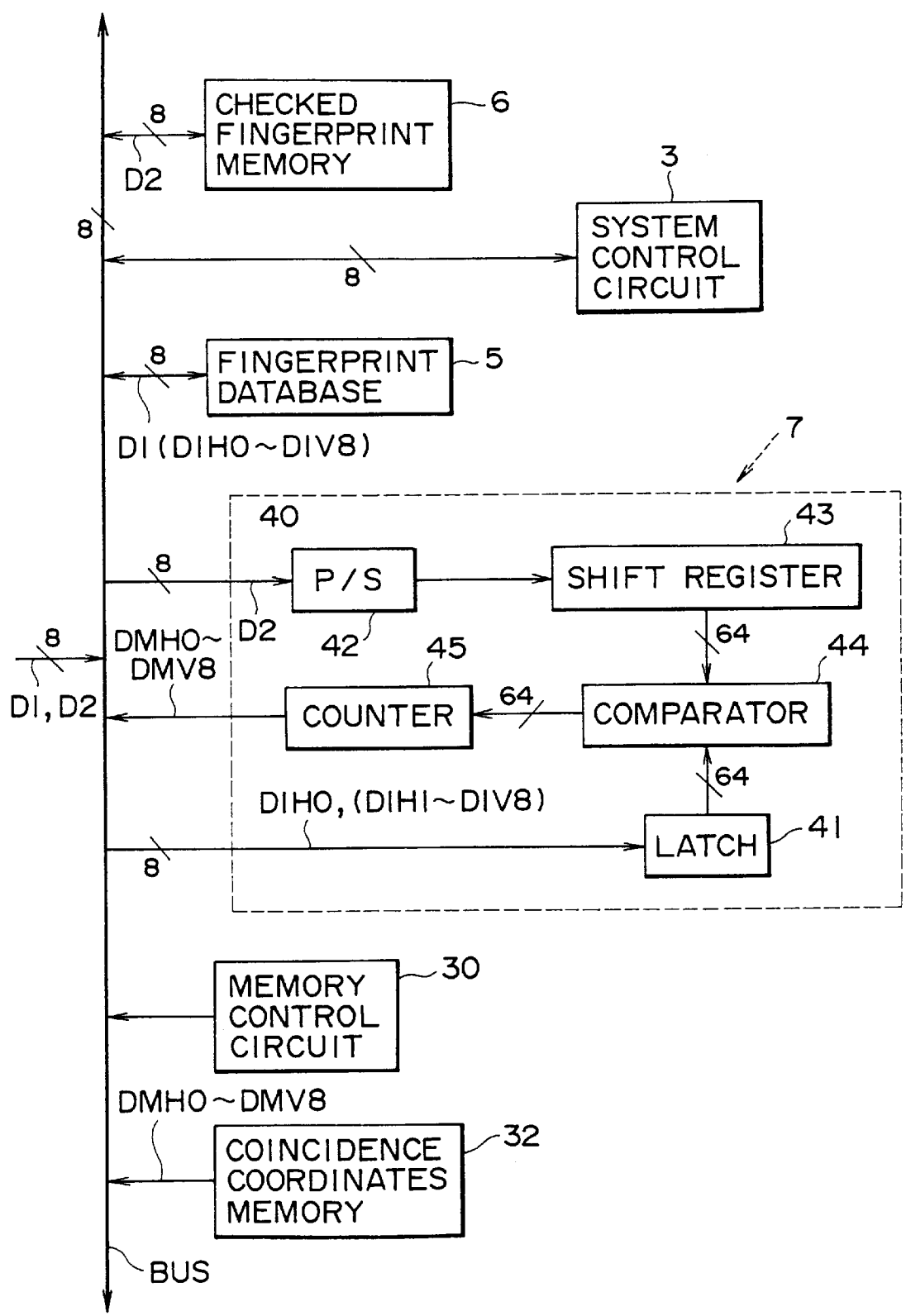
FIG. 5 is a block diagram illustrating a part of a collation rate detector together with peripheral circuits.

FIG. 5 is a block diagram illustrating the fingerprint database 5, the checked fingerprint memory 6, and the system control circuit 3 and a part of the collation rate detector 7. The checked fingerprint memory 6 here holds the aforementioned fingerprint data D1 and D2 supplied from the fingerprint data section 4 when the fingerprint data D1 are to be registered into the fingerprint database 5 or a fingerprint is to be collated.

The checked fingerprint memory 6, when a fingerprint is to be registered, supplies in 8-pixel units the fingerprint data D1 it holds in a prescribed sequence in the horizontal and vertical directions under the address control of a memory control circuit 30 executed under the control of the system control circuit 3. When a fingerprint is to be collated, the checked fingerprint memory 6 sequentially and selectively supplies the fingerprint data D2 it holds in response to the operation, to be described below, of the collation rate detector 7.

The fingerprint database 5 comprises user data, the fingerprint data D1 and the like registered in advance. As illustrated in FIG. 6, this fingerprint database 5 is disposed so that a user ID is registered for each set of registered user data and, for each user ID, nine lines each of horizontal direction registered data D1H0 to D1H8 and vertical direction registered data D1V0 to D1V8 together with positional information (X0, Y0) to (X8, Y0) and (X0, Y0) to (X0, Y8) on the registered data D1H0 to D1H8 and D1V0 to D1V8, respectively.

Figure 7:
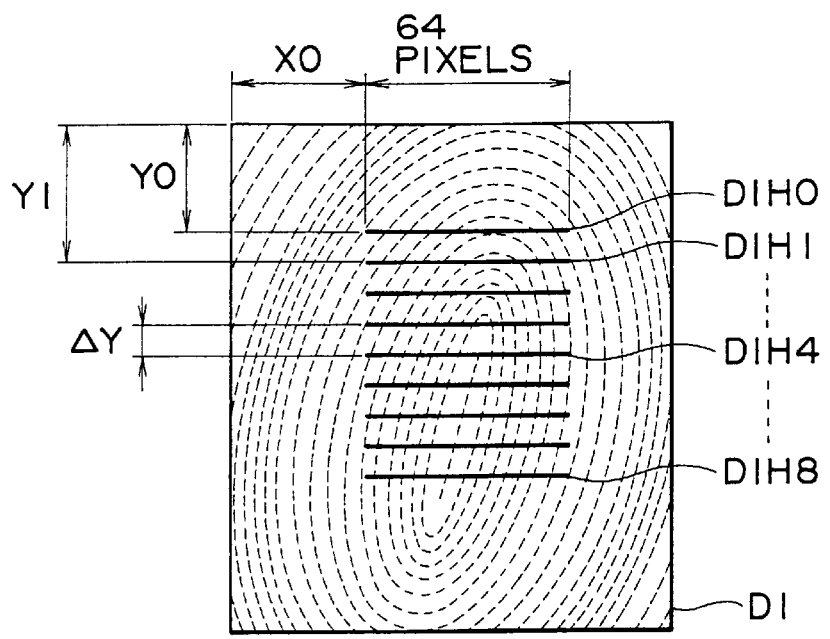
FIG. 7 is a schematic diagram for use in the description of cutting-out of linear images.
Figure 8:
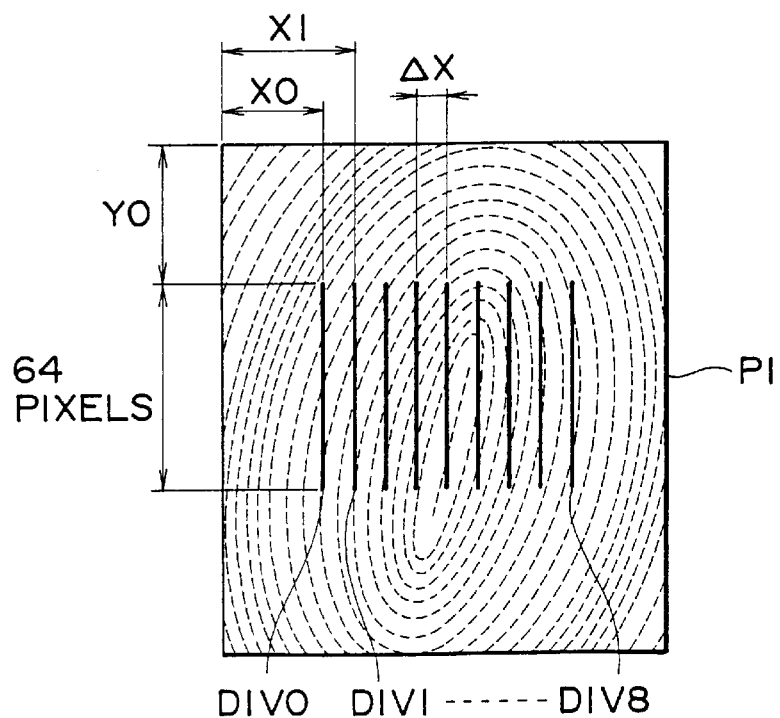
FIG. 8 is a schematic diagram for use in the description of linear images cut out in a different direction from the linear images in FIG. 7.

The horizontal direction registered data D1H0 to D1H8 here are sequentially cut out in 64-pixel units and registered into the fingerprint database 5 so that the image of the fingerprint data D1 temporarily held by the checked fingerprint memory 6 is extended in the horizontal direction. Thus the fingerprint database 5 cuts out of each image to be collated, and holds, a total of nine areas each consisting of 1 pixel in the vertical direction and 64 pixels in the horizontal direction (hereinafter such areas are referred to as horizontal direction linear images) (FIG. 7). On the other hand, 64-pixel units of the vertical direction registered data D1V0 to D1V8 are sequentially cut out and registered into the fingerprint database 3 so that the image of the fingerprint data D1 temporarily held by the checked fingerprint memory 6 be extended in the vertical direction. Thus the fingerprint database 5 cuts out of each image to be collated, and holds, a total of nine areas each consisting of 1 pixel in the horizontal direction and 64 pixels in the vertical direction (hereinafter such areas are referred to as vertical direction linear images) (FIG. 8).

In this preferred embodiment, it is disposed so that the horizontal direction registered data D1H0 to D1H8 and vertical direction registered data D1V0 to D1V8 are sequentially cut out of the checked fingerprint memory at prescribed intervals. The positional information (X0, Y0) to (X8, Y0) and (X0, Y0) to (X0, Y8) consists of coordinates specifying reference positions for each linear image on the image of the fingerprint data D1.

The fingerprint database 5, when collating the fingerprint, supplies to the data bus BUS under the control of the system control circuit 3 these horizontal direction registered data D1H0 to D1H8, vertical direction registered data D1V0 to D1V8, and positional information (X0, Y0) to (X8, Y0) and (X0, Y0) to (X0, Y8) it holds.

The collation rate detector 7 (FIG. 5), into which the image data D1H0 to D1H8 and D1V0 to D1V8 of each linear image are sequentially entered, sequentially displaces the entered linear images on the image of the fingerprint data D2, which is the object to be collated with. Then the collation rate detector 7, by sequentially obtaining in each position of displacement the result of comparison between the linear images and the overlapping parts of the image of the fingerprint data D2, sequentially detects the degrees of coincidence indicating how closely each linear image coincides with a part of the image of the fingerprint data D2. The collation rate detector 7 thereby detects the distribution of the degrees of coincidence.

The collation rate detector 7 then corrects the distributions of the degrees of coincidence, and calculates from the result of correction the collation rate between the images of the fingerprint data D1 and D2, and from this collation rate whether or riot the two fingerprints coincide with each other. In correcting the distributions of the degrees of coincidence, the collation rate detector 7 detects degrees of coincidence above a prescribed threshold out of the sequentially detected degrees of coincidence. It further stores into a coincidence-coordinates memory 32 degrees of coincidence above the threshold and coordinates indicating each position of displacement. Then it executes rounding to be described below.

Thus a coincidence detector 40, under the control of the system control circuit 3, selectively sets the fingerprint data D1H0 to D1H8 and D1V0 to D1V8, stored in the fingerprint database 5, into a latch circuit 41. The coincidence detector 40 is sequentially supplied by the checked fingerprint memory 6, under the control of the memory control circuit 30, with the following fingerprint data D2 so that the image of the set fingerprint data D1H0 to D1H8 and D1V0 to D1V8 raster-scan the image of the fingerprint data D2.

In the coincidence detector 40, a parallel-to-serial (P/S) converter 41 converts the sequentially entered fingerprint data D2 into serial data, and supplies the converted data to a shift register 43 in fixed periods. The shift register 43 holds 64 bits of the serial data, sequentially bit-shifts them in synchronism with the serial data supplied from the P/S converter 42 and, at the same time, supplies 64 bits in parallel of the bit-shifted data.

The latch circuit 41 supplies 64 bits in parallel of the latched 8-byte fingerprint data D1H0 to D1H8 and D1V0 to D1V8. A comparator 44, consisting of a 64-line exclusive OR circuit, supplies the result of bit-by-bit comparison of the output data of the shift register 43 and those of the latch circuit 41.

Figure 9:
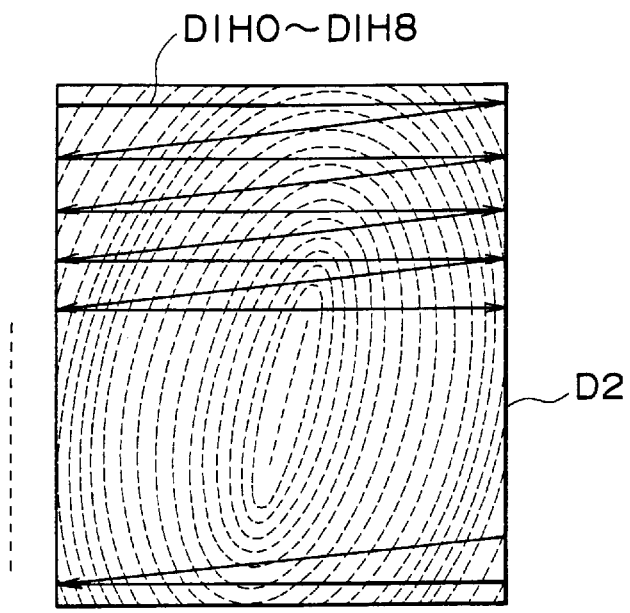
FIG. 9 is a schematic diagram for use in the description of scanning of the linear images of FIG. 7.

The coincidence detector 40 supplies, where for instance the fingerprint data D1H0 to D1H8 cut out in the horizontal direction are set, the comparator 44 with the 64-pixel fingerprint data D2 and D1H0 to D1H8, which overlap each other, as illustrated in FIG. 9, when the linear images of the fingerprint data D1H0 to D1H8 are caused to raster-scan the image of the fingerprint data D2. Then, it is judged whether or not bit-by-bit coincidence exists between the 64-pixel fingerprint data D2 and D1H0 to D1H8 which overlap each other.

Figure 10:
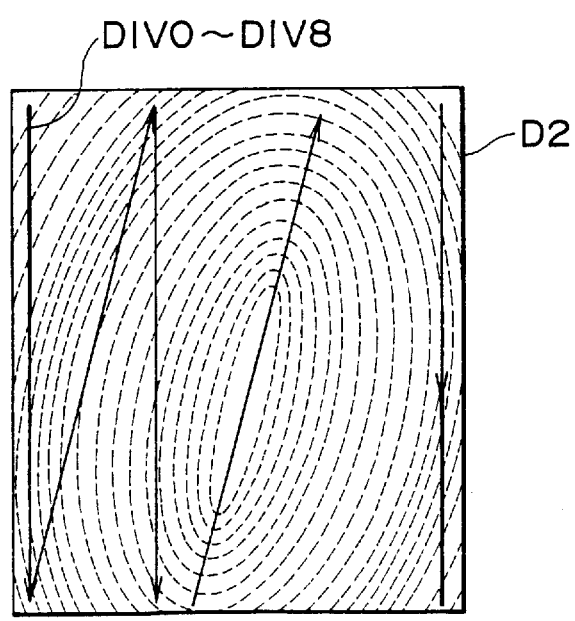
FIG. 10 is a schematic diagram for use in the description of scanning of the linear images of FIG. 8.

Then, the coincidence detector 40 supplies, where for instance the fingerprint data D1V0 to D1V8 cut out in the vertical direction are set, the comparator 44 with the 64-pixel fingerprint data D2 and D1V0 to D1V8, which overlap each other, as illustrated in FIG. 10, when the linear images of the fingerprint data D1H0 to D1H8 are caused to raster-scan the image of the fingerprint data D2. Then, it is judged whether or not bit-by-bit coincidence exists between the 64-pixel fingerprint data D2 and D1V0 to D1V8 which overlap each other.

A counter 45 counts the 64-line comparison result supplied by the comparator 44, and supplies the count. The counter 45 thereby detects the degree of coincidence between the linear images of the fingerprint data D1H0 to D1H8 and D1V0 to D1V8 on the one hand and the image of the fingerprint data D2, which overlaps these linear images, on the other. Incidentally, where the overlapping images completely coincide with each other, the counter 45 supplies a degree of coincidence having a value of 64. Furthermore, in accordance with the scanning of linear images over the image of the fingerprint data D2, the counter 45 sequentially detects the degrees of coincidence and, on that basis, the distribution of the degrees of coincidence. The collation rate detector 7 thereby judges whether or not the groups of degrees coincidence DMH0 to DMV8 sequentially detected by the coincidence detector 40 are above the prescribed threshold, and detects degrees of coincidence above the threshold.

Figure 11:
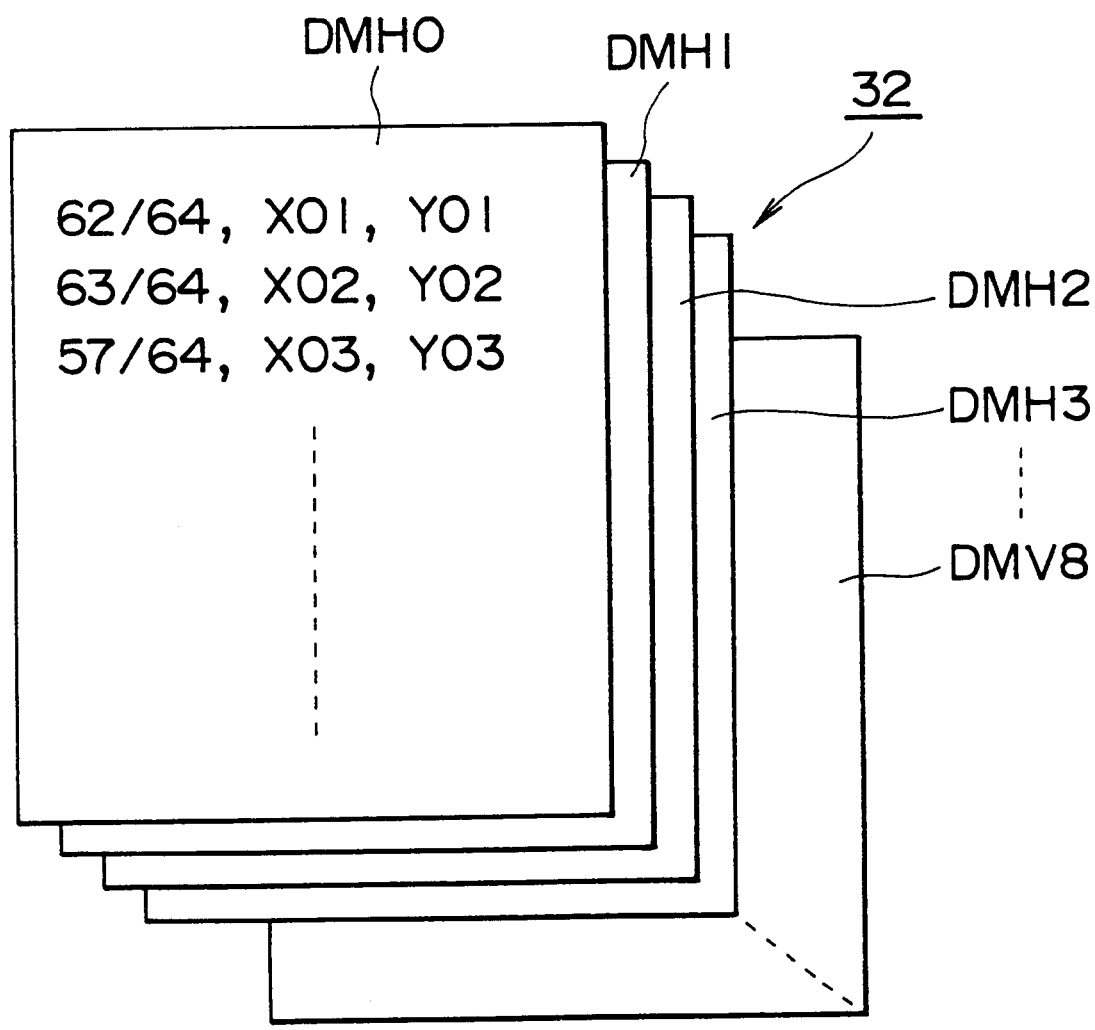
FIG. 11 is a schematic diagram for use in the description of a coincidence-coordinates memory.

The coincidence-coordinates memory 32, as shown in FIG. 11, stores the group of above-threshold degrees of coincidence DMH0 to DMV8 (62/64, 63/64, 57/64, . . . ) detected by the system control circuit 3 separately for the fingerprint data D1H0 to D1H8 and D1V0 to D1V8 of the linear images and the coordinates ((X01, Y01), (X02, Y02), (X03, Y03), . . . ) at which these degrees of coincidence were detected. The coincidence-coordinates memory 32, under the control of the system control circuit 3, then supplies the system control circuit 3 sequentially with the stored degrees of coincidence DMH0 to DMV8 and coordinates.

Figure 12:
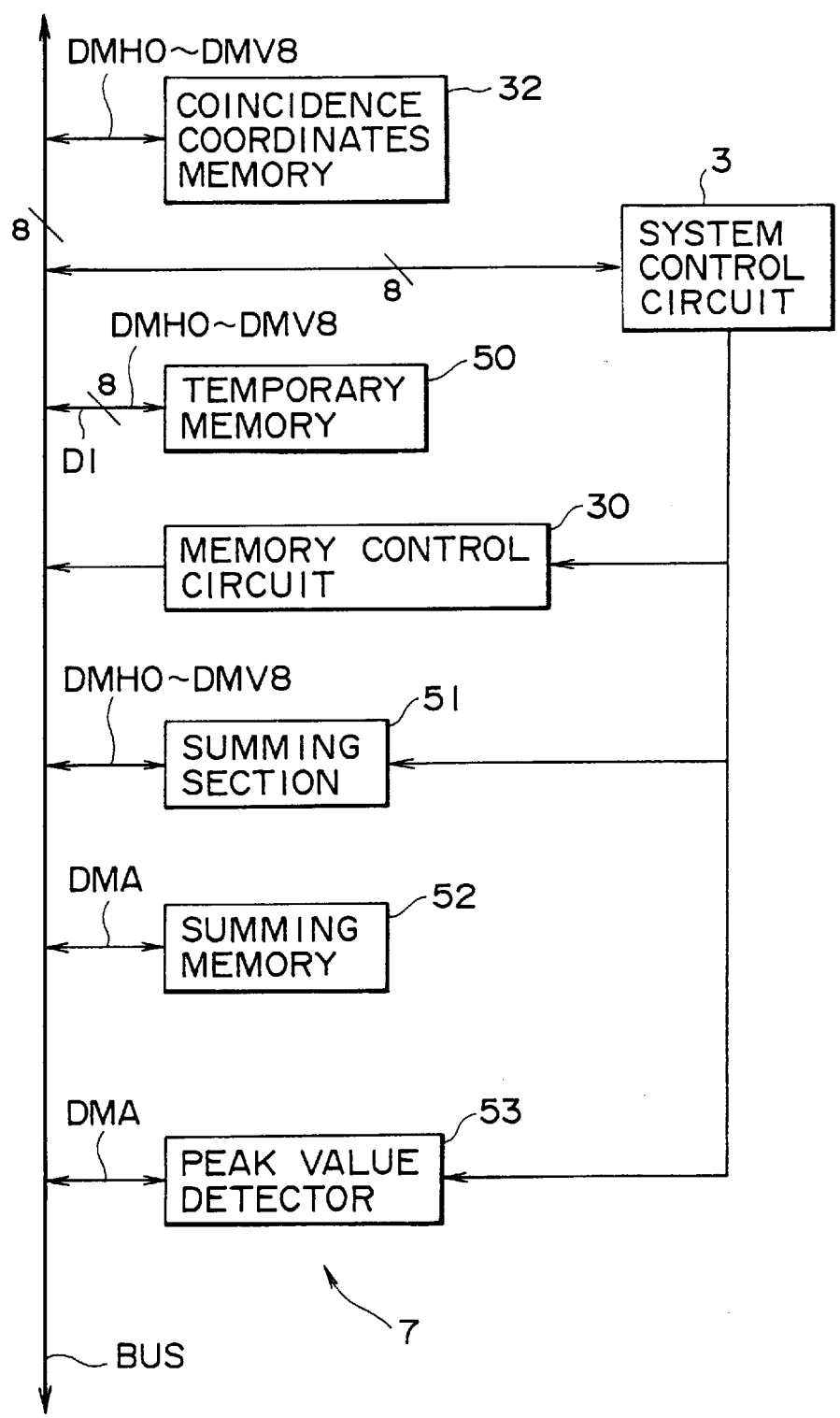
FIG. 12 is a block diagram illustrating the rest of the collation rate detector of FIG. 5.

FIG. 12 is a block diagram illustrating the rest of the collation rate detector 7. In this collation rate detector 7, a temporary memory 50, having areas for 256×128 pixels corresponding to a fingerprint image, clears its content to a value of 0 for every linear image when a fingerprint is being collated. Then, under the control of the system control circuit 3 executed through the memory control circuit 30, the temporary memory 50 stores the above-threshold degrees of coincidence DMH0 to DMV8 supplied sequentially from the system control circuit 3 to the data bus BUS. In doing so, the temporary memory 50 stores these above-threshold degrees of coincidence DMH0 to DMV8 in areas corresponding to the individual pairs of coordinates ((X01, Y01), (X02, Y02), (X03, Y03), . . . ). The temporary memory 50 thereby registers the distribution of the degrees of coincidence derived by setting for each linear image below-threshold degrees of coincidence to a value of 0 and above-threshold degrees of coincidence as detected.

Figure 15:
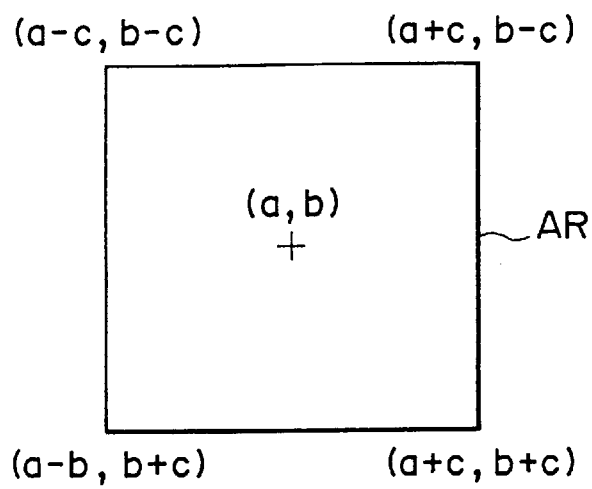
FIG. 15 is a schematic diagram for use in the description of rounding processing.

Then, in the temporary memory 50, the degrees of coincidence in a prescribed area AR around each above-threshold degree of coincidence are set by the system control circuit 3 to these above-prescribed degrees of coincidence (FIG. 15).

The temporary memory 50 then supplies a summing section 51 with data stored as describes above on the distribution of the degrees of coincidence sequentially via the data bus BUS.

The summing section 51 starts operating under the control of the system control circuit 3. It sequentially, adds the degrees of coincidence DMA held by a summing memory 52 and the degrees of coincidence supplied by the temporary memory 50. It also stores into the summing memory 52 the cumulative degree of coincidence DMA resulting from the summing.

The summing memory 52, when a fingerprint is collated, updates its contents under the control of the system control circuit 3 executed via the memory control circuit 30. Then it stores the degrees of coincidence DMA supplied sequentially from the summing section 51 through the data bus BUS. In doing so, the summing memory 52, under the control of the system control circuit 3, varies the area in which to store the degree of coincidence DMA according to the coordinates of each linear image registered in the fingerprint database 5. The summing memory 52 thereby corrects the coordinates of the degree of coincidence by the relative position of each linear image in relation to others, and stores data on the distribution of the degrees of coincidence so corrected. It also supplies either the summing section 51 or a peak value detector 53 with the stored degrees of coincidence DMA via the data bus BUS.

The collation rate detector 7, after rounding in advance the distributions of the degrees of coincidence thereby detected separately for individual linear images, corrects the distributions with the positional relationships of the linear images, and sums them up in the summing memory 52.

Accordingly, the temporary memory 50 and the summing memory 52 are configured to have an expansion commensurate with the 256×128 pixels of a fingerprint image and a height required of each memory. Incidentally, since the peak value of the degree of coincidence is supposed to be 64 in this embodiment of the invention, a memory space of 256×128×10 bits is secured in the summing memory 52.

The peak value detector 53 starts operating under the control of the system control circuit 3. When the distributions of the degrees of coincidence for all the linear images are totaled in the summing memory 52, the peak value detector 53 sequentially supplies these degrees of coincidence DMA via the data bus BUS and detects their peak value. It further supplies the detected peak value to the system control circuit 3.

The system control circuit 3, consisting of a microcomputer or the like, controls the overall operation of this fingerprint comparing apparatus 1. Through this overall control, the system control circuit 3 registers the fingerprint data D1 in the fingerprint database 5, and executes fingerprint collation with reference to this fingerprint database 5.

Figure 13:
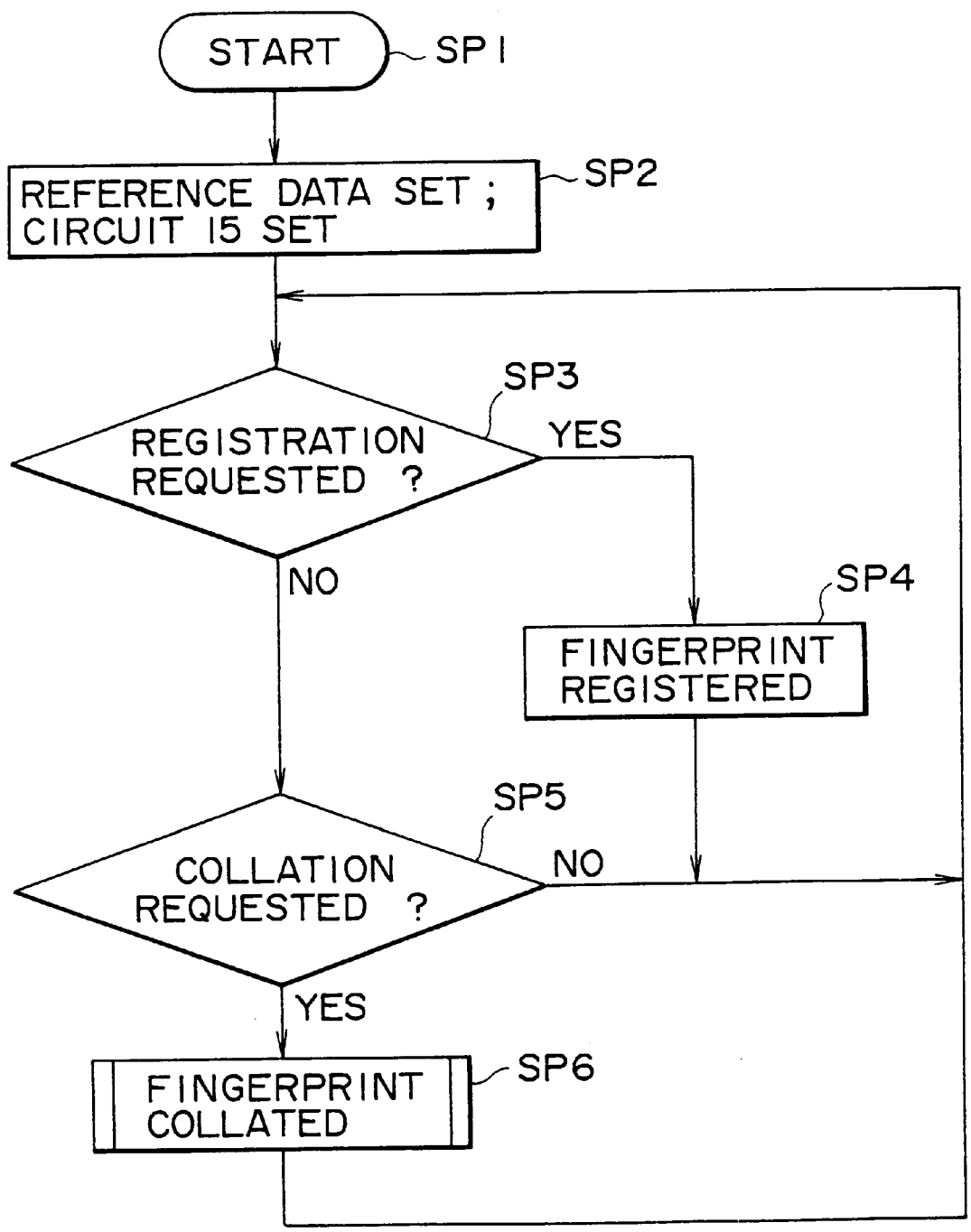
FIG. 13 is a flow chart showing the procedure of processing by the system control circuit 3.

FIG. 13 is a flow chart roughly illustrating the procedure of processing by this system control circuit 3. When the power is turned on, the system control circuit 3 moves on from step SP1 to SP2. Here the system control circuit 3 sets reference data held in a prescribed memory in the reference data setting circuit 15. At that time, the system control circuit 3 sets the reference data REF of the comparator 14 so as to correct unevenness in luminous energy of the optical system. The system control circuit 3 thereby makes it possible for even an optical system of a simple configuration to obtain a correct result of collation.

Then the process moves on to step SP3, and it is judged whether or not a request for fingerprint registration has been entered. Here in this embodiment of the invention, a request for fingerprint registration can be inputted by entering a prescribed command and a personal identification number among other things by manipulating the key input section 2. At this request for fingerprint registration, the system control circuit 3 registered each user's fingerprint data D1 in the fingerprint database 5. Thus the processing by the system control circuit 3, upon entry of this request for fingerprint registration, will go on to step SP4 if an affirmative result is obtained at step SP3. The processing by the system control circuit 3 then executes fingerprint registration and returns to step SP3.

In this processing to register a fingerprint, the system control circuit 3 monitors the output data D1 of the S/P converter 21, and detects the placement of a finger on the prism 11. As a finger is placed, the system control circuit 3 further fetches the output data D1 of the S/P converter 21 into the checked fingerprint memory 6. It further cuts linear images, described above with reference to FIGS. 7 and 8, out of the fingerprint data D1 fetched into the checked fingerprint memory 6, and registers them in the fingerprint database 5.

If no request for fingerprint registration is entered, the system control circuit 3 moves on from step SP3 to step SP5, and judges whether or not a request for fingerprint collation has been entered by manipulating the key input section 2. If a negative result is obtained here, the system control circuit 3 will return to step SP3. Or if a request for fingerprint collation is detected, the system control circuit 3 will move on from step SP5 to step SP6. Then it executes fingerprint collation and returns to step SP3.

FIG. 14 is a flow chart showing the processing procedure of this fingerprint collation. If the user manipulates the key input section 2 and enters a request for fingerprint collation, the processing by the system control circuit 3 goes on from step SP5 to step SP6. Here the system control circuit 3 monitors the logical level of the fingerprint data D2 supplied to the data bus BUS, and, as the user places a finger on the prism 11, stores the fingerprint data D2 into the checked fingerprint memory 6.

Then the processing by the system control circuit 3 moves on to step SP7, and sets a variable m to a value of 0. The variable m here specifies the 9×2 data D1H0 to D1V8 per user registered in the fingerprint database 5 with respect to the user ID.

The processing by the system control circuit 3 then goes on to step SP8. Here the system control circuit 3, with reference to a user ID entered from the key input section 2, loads from the fingerprint database 5 the mth set of registered data D1H0 of this user ID in the horizontal direction, and sets this set of registered data D1H0 in the coincidence detector 40.

Then the processing by the system control circuit 3 moves on to step SP9, where the system control circuit 3 sequentially supplies the fingerprint data D2 stored in the checked fingerprint memory 6 to the coincidence detector 40. The system control circuit 3, as stated above with reference to FIG. 9, thereby causes the coincidence detector 40 to have the linear images of the registered data D1H0 raster-scan the image of the fingerprint data D2. It further detects a group of degrees of coincidence DMH0 in each scanning position, and thereby detects the distribution of the degrees of coincidence. The system control circuit 3 further sequentially compares this detected group of degrees of coincidence DMH0 with a prescribed threshold, and stores the degrees of coincidence higher than this threshold, together with the corresponding coordinates of the fingerprint data D2, into the coincidence-coordinates memory 32. The system control circuit 3 thereby registers in the coincidence-coordinates memory 32 the degrees of coincidence whose distribution has been corrected.

The processing by the system control circuit 3 then moves on to step SP10, where the system control circuit 3 increments the variable m. The processing by the system control circuit 3 goes on to step SP11, where the system control circuit 3 judges whether or not the variable m has surpassed a value of 9. It judges whether or not a distribution of the degrees of coincidence has been detected regarding each of the nine linear images, and a negative result will be obtained to cause the processing to return to step SP8. Thus the system control circuit 3 repeats the procedure sequence of steps SP8-SP9-SP10-SP11-SP8, and detects with the coincidence detector 40 the distribution of the group of degrees of coincidence DMH0 to DMH8 for each of the nine linear images cut out horizontally.

Having thus detected the distribution of the group of degrees of coincidence DMH0 to DMH8 for each of the nine linear images, the processing by the system control circuit 3 obtains an affirmative result at step SP11, and moves on to step SP12, where the system control circuit 3 judges whether or not the distribution of the groups of degrees of coincidence DMV0 to DMV8 has been detected regarding the registered data D1V0 to D1V8 in the vertical direction. A negative result will be obtained to cause the processing by the system control circuit 3 to move on to step SP13, where the processing switches its object to the registered data D1V0 to D1V8 in the vertical direction and, resetting the variable m to a value of 0, returns to step SP8.

Thus the system control circuit 3 similarly repeats the procedure sequence of steps SP8-SP9-SP10-SP11-SP8, and detects with the coincidence detector 40 the distribution of the group of degrees of coincidence DMV0 to DMV8 for each of the nine linear images cut out vertically. It further corrects the result of detection, and stores the corrected result into the coincidence-coordinates memory 32.

As the distribution of the group of degrees of coincidence DMH0 to DMV8 is detected regarding linear images in the vertical direction, the processing by the system control circuit 3 obtains an affirmative result at step SP12, and moves on to step SP14, where the system control circuit 3 executes collation rate detection, and detects the collation rate from the distribution of the degrees of coincidence detected for 9×2 linear images.

Then the processing by the system control circuit 3 moves on to step SP15, where it is judged whether or not the collation rate N is above a certain level. If the collation rate N is judged not to be above that level, the processing by the system control circuit 3 goes on to step SP16, and the system control circuit 3 will give a judgment of non-coincidence. Or if the collation rate is found to be above that level, the processing by the system control circuit 3 moves on to SP17, and the system control circuit 3 will give a judgment of coincidence. After that the processing by the system control circuit 3 goes on to step SP18, and completes the whole processing.

Figure 1:
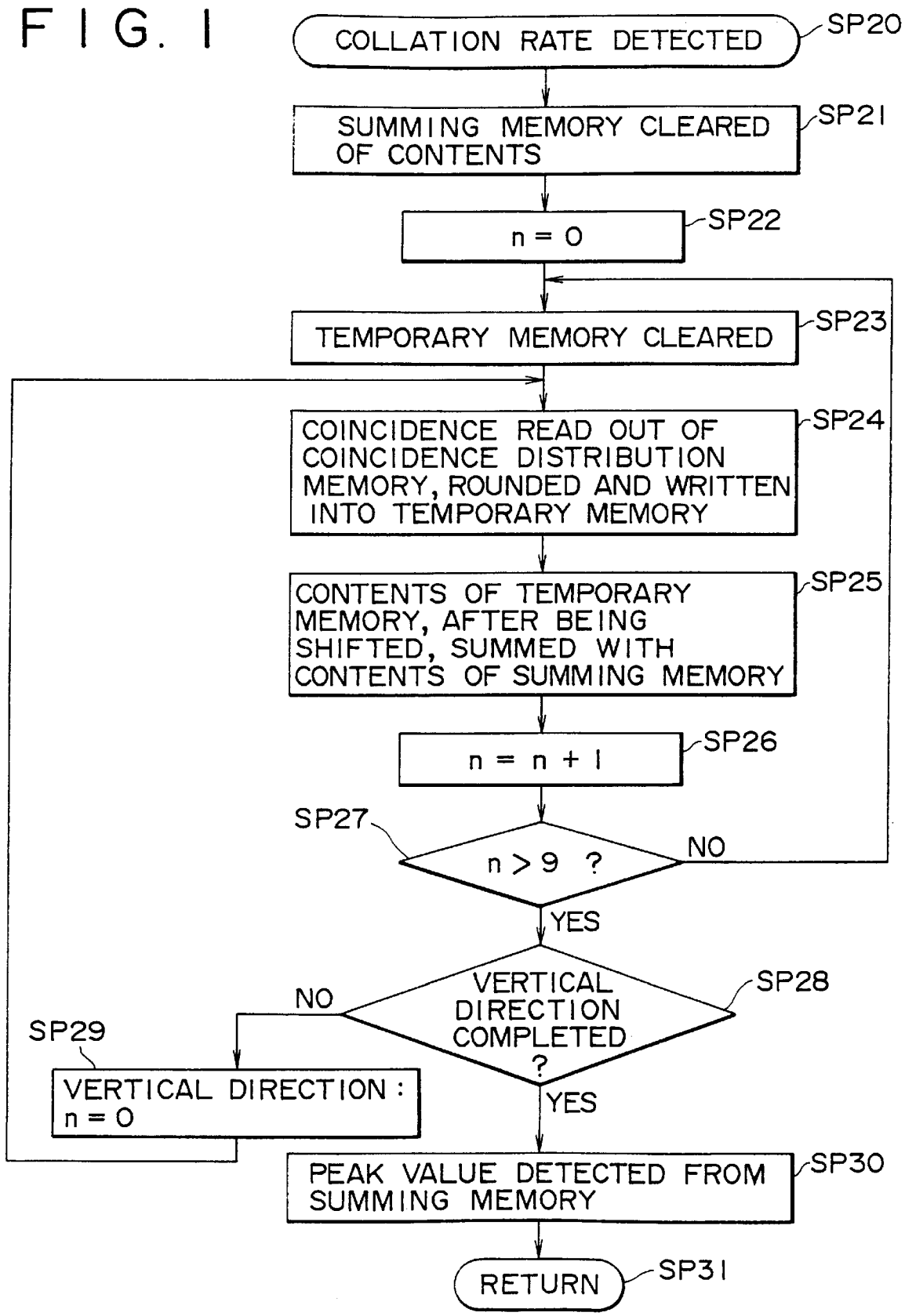
FIG. 1 is a flow chart for use in the description of a fingerprint comparing apparatus, which is a preferred embodiment of the present invention.

FIG. 1 is a flow chart illustrating the collation rate detection processing by this system control circuit 3. The processing by the system control circuit 3 moves on from step SP20 to step SP21, and the summing memory 52 is cleared of its contents. Then the processing by the system control circuit 3 goes on to step SP22, where a variable n is set to a value of 0. The variable n here is a variable specifying each of the distributions of the degrees of coincidence stored in the coincidence-coordinates memory 32.

Then the processing by the system control circuit 3 moves on to step SP23 to clear the temporary memory of its contents. The processing by the system control circuit 3 then goes on to step SP24, where the group of degrees of coincidence DMH0 to DMV8 designated by the variable n are rounded and stored into the temporary memory 50. Thus the system control circuit 3 reads out of the coincidence-coordinates memory 32 the distribution of the degrees of coincidence specified by the variable n (consisting, in this case, of the degrees of coincidence above a threshold detected with respect to the registered data D1H0 in the horizontal direction and their coordinates). It further registers into the temporary memory 50 the degrees of coincidence read out with reference to the coordinates which have been readout. The system control circuit 3 thereby registers into the temporary memory 50 the distribution of the degrees of coincidence derived by setting the degrees of coincidence below the threshold and those above the threshold to a value of 0 degree of coincidence and the detected degrees of coincidence, respectively.

Figure 16:
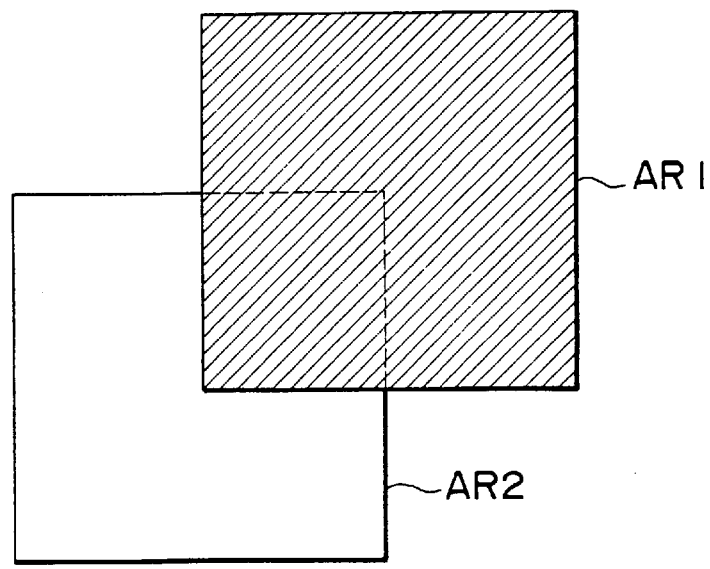
FIG. 16 is a schematic diagram for use in the description of processing that takes place where areas of FIG. 15 overlap each other.

The system control circuit 3 then, as illustrated in FIG. 15, sets a prescribed area AR around each of these degrees of coincidence, which have been read out, to this read-out group of degrees of coincidence DMH0. Or if, as shown in FIG. 16, groups of degrees of coincidence DMH0 above the prescribed threshold are mutually so close that the areas AR1 and AR2 of the mutually close groups of degrees of coincidence DMH0 overlap each other, the group of degrees of coincidence DMH0 having the greater value will be assigned to this overlapping part.

Figure 17:
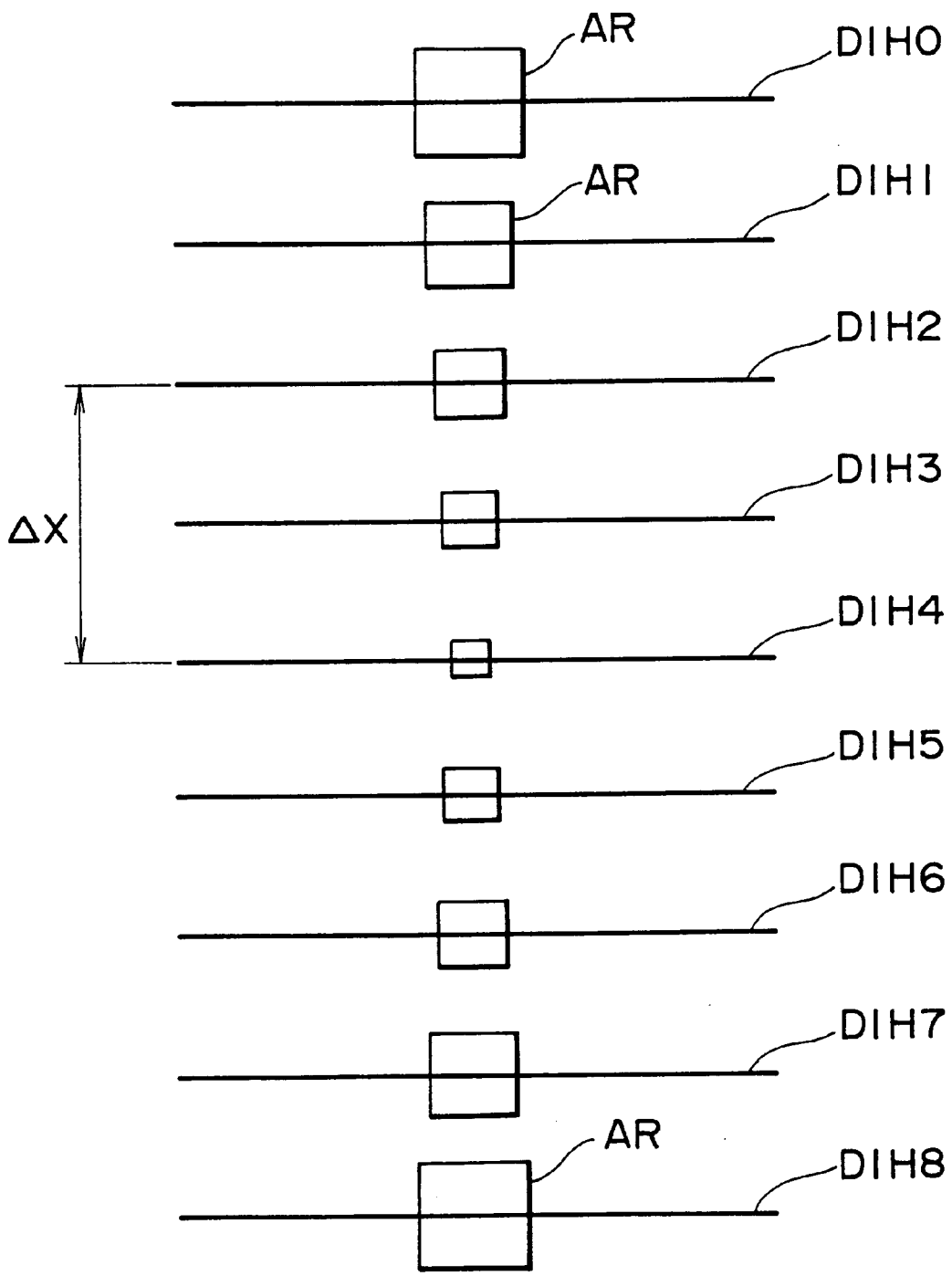
FIG. 17 is a schematic diagram illustrating the relationship between a reference linear image and the area of FIG. 15.

Further, as shown in FIG. 17, the system control circuit 3 sets the contents of the temporary memory 50 so that, with the central one out of the nine linear images of the registered data D1H0 to D1H8 in the horizontal direction as reference, the area AR for updating this group of degrees of coincidence DMH0 expands as its distance from the central line image increases.

As the groups of degrees of coincidence DMH0 are rounded and stored into the temporary memory 50 for the first distribution of the degrees of coincidence, the processing by the system control circuit 3 moves on to step SP25, where the summing section 51 is instructed to start operating. This causes the system control circuit 3 to add the groups of degrees of coincidence DMH0 in the temporary memory 50 to the counterpart contents registered in the summing memory 52. The result of addition is further registered into the summing memory 52. Incidentally, when processing the first distribution of the degrees of coincidence, the system control circuit 3, as it cleared the summing memory 52 of its contents at step S21, transfers the groups of degrees of coincidence) DMH0 in the temporary memory 50 to the summing memory 52.

Then the system control circuit 3, as illustrated in FIGS. 18A) and 18B, with the central one out of the nine linear images in the horizontal direction as reference, corrects the distance from this central linear image to each of the other linear images (i.e., in FIG. 6, shifts the coordinates by (X4-X0, Y4-Y0), and stores into the summing memory the groups of degrees of coincidence processed by the summing section 51. Incidentally, in this FIG. 18, the area AR set to a degree of coincidence above the prescribed level at step SP24 is expressed in a rectangular shape.

Having updated the contents of the summing memory 52 in this manner, the processing by the system control circuit 3 moves on to step S26, where the variable n is incremented. The processing by the system control circuit 3 then goes on to step SP27, where the system control circuit 3, by judging whether or not the variable n has surpassed a value of 9, determines whether or not processing has been completed for the nine distributions of the degrees of coincidence detected for each of the registered data D1H0 to D1H8 in the horizontal direction. If a negative result is obtained here, the processing by the system control circuit 3 will return to step SP23, and repeat the processing for the following distribution of the group of degrees of coincidence DMH1.

The system control circuit 3 thus repeats the procedure sequence of steps SP23-SP24-SP25-SP26-SP27-SP23, and sequentially rounds the nine distributions of the degrees of coincidence detected for each of the registered data D1H0 to D1H8 in the horizontal direction. The system control circuit 3 further corrects the rounded group of degrees of coincidence DMH0 to DMH8 with the respective distances from the central linear image, and sequentially adds the corrected degrees with the summing section 51 (FIGS. 8C and 8D).

The system control circuit 3 thereby sums up the distributions of the degrees of coincidence, if the linear images according to the registered data D1H0 to D1H8 in the horizontal direction essentially are to coincide with the fingerprint image according to the fingerprint data D2, the degrees of coincidence detected in the position where the fingerprint image and the liner images can precisely overlap each other.

Thus, where the degrees of coincidence are to be detected by scanning the image of the fingerprint data D2 with linear images consisting of repetitions of alternate bright and dark parts, even if the linear images and the fingerprint image essentially are not to coincide with each other, a high degree of coincidence may be detected in a plurality of positions on each linear image. Or if the linear images and the fingerprint image essentially are to coincide with each other, a high degree of coincidence is also detected elsewhere than in the positions where the fingerprint image and the linear images precisely overlap each other.

However, where the coordinates are corrected according to the positional relationship among linear images and the distributions of the degrees of coincidence are summed up on that basis, it may be difficult to detect a high peak among such degrees of coincidence. By contrast, if the fingerprint and the linear images essentially are to coincide with each other, the degrees of coincidence detected in a position where the fingerprint image and the linear images precisely overlap each other give a higher peak (represented by code DMA in FIG. 18) than when the coordinates are corrected according to the positional relationship among linear images and the distributions of the degrees of coincidence are summed up accordingly. On the basis of this principle, the system control circuit 3. detects this peak with the peak value detector 53 and calculates the collation rate on that basis.

Having summed up the distributions of the degrees of coincidence for the nine linear images in the horizontal direction, the processing by the system control circuit 3 moves on to step SP28, where it judges whether or not the distributions of the degrees of coincidence in the vertical direction have been summed up. A negative result will be obtained to cause the processing by the system control circuit 3 to move on to step SP29, where the processing switches its object to the degrees of coincidence detected for linear images in the vertical direction and, resetting the variable n to a value of 0, returns to step SP24.

Then the system control circuit 3, after similarly rounding the distributions of the groups of degrees of coincidence DVM0 to DMV8 detected for linear images in the vertical direction, updates the contents of the summing memory 52 and sums up the distributions of the degrees of coincidence.

Having thus summed up the distributions of the degrees of coincidence for the vertical direction as well, the processing by the system control circuit 3 moves on to step SP28 to step SP30, instructs the peak value detector 53 to start operating. This causes the system control circuit 3 to detect DMA by having the peak value detector 53 sequentially read out the contents of the summing memory 52. The system control circuit 3 then goes on to step SP31 to complete this processing procedure, and thereby judges the presence or absence of coincidence by setting as collation rate the peak value DMA of the result of this summing.

In the fingerprint comparing apparatus 1 of the above-described configuration, when the power supply is turned on (FIGS. 2, 3 and 13), prescribed reference data are set in the reference data setting circuit 15 under the control of the system control circuit 3. This causes reference data REF to be set for the comparator 14 so as to correct unevenness in luminous energy of the optical system.

Then, as the user manipulates the key input section 2 (FIG. 2), the fingerprint comparing apparatus 1 executes fingerprint registration and fingerprint collation.

In this fingerprint registration processing by the fingerprint comparing apparatus 1, the illuminating beam emitted from the light source 12 is reflected by the base of the isosceles triangle prism 11, and the CCD camera 13 picks up an image. The picked-up image is further converted by the comparator 14 into a binary digital video signal. The binary signal S1 supplied by this comparator 14, after being latched by the latch circuit 18 to be converted into 1-bit image data DV1, is further converted by the S/P converter 21 into 1-byte image data D1 in 8-pixel units.

The fingerprint comparing apparatus 1, responding to this change in image data D1 supplied by the S/P converter 21, starts processing fingerprint registration. The fingerprint comparing apparatus 1 is thereby enabled to register a fingerprint by simple operation.

When the fingerprint comparing apparatus 1 starts processing fingerprint registration, the image data D1 supplied from the S/P converter 21 are stored into the checked fingerprint memory 6 (FIG. 5). The nine linear images each, extending in the vertical and horizontal directions, are then cut out of the fingerprint data D1 (FIGS. 7 and 8). The image data D1H0 to D1V8 of these linear images, together with the coordinates of each linear image and the user ID, are stored into the fingerprint database 5 (FIG. 6). Having completed these actions, the fingerprint comparing apparatus 1 completes processing of fingerprint registration.

On the other hand, when the user enters his or her user ID and instructs collation of a fingerprint, the fingerprint comparing apparatus 1, in the same manner as in registering a fingerprint, starts processing fingerprint collation on the basis of the logical level of the image data supplied to the data bus BUS. The fingerprint comparing apparatus 1 first stores the fingerprint image entered by the user (FIGS. 2, 3, 5 and 14).

The fingerprint database 5 is accessed according to the user ID, and the registered data D1H0 in the horizontal direction are first stored into the coincidence detector 40, and the fingerprint data D2 stored in the checked fingerprint memory 6 are further supplied to the coincidence detector 40 so that the linear images of the registered data D1H0 raster-scan the fingerprint image of the fingerprint data D2 (FIG. 9).

These two lines of fingerprint data D1H0 and D2 are subjected to sequential detection of coincidence or non-coincidence of each pixel by the comparator 44, and results indicating coincidence are counted by the counter 45. In response to that, the fingerprint comparing apparatus 1 sequentially detects a group of degrees of coincidence DMH0, indicating the degree of coincidence between linear images and the fingerprint image, in each raster-scanning position, and detects the distribution of the degrees of coincidence. It further detects degrees of coincidence above the prescribed threshold out of the degrees of coincidence detected sequentially. In the fingerprint comparing apparatus 1, coordinates corresponding to the degrees of coincidence above this threshold are sequentially stored into the coincidence-coordinates memory 32. These actions cause the distribution of the degrees of coincidence DMH0 to be corrected and detected.

Having detected in this manner the distribution of the degrees of coincidence DMH0 with respect to the first set of registered data D1H0 in the horizontal direction, the fingerprint comparing apparatus 1 similarly detects the distributions of the degrees of coincidence DMH1 to DMH8 with respect to the second to ninth sets of registered data D1H1 to D1H8 in the horizontal direction. It then detects the distributions of the degrees of coincidence DMV1 to DMV8 with respect to the registered data D1V1 to D1V8 in the vertical direction (FIGS. 10 and 11). It further detects degrees of coincidence above the threshold out of the detected degrees of coincidence, and stores the above-threshold degrees of coincidence, together with their coordinates, into the coincidence-coordinates memory 32.

Out of these detected distributions of the groups of degrees of coincidence DMH0 to DMV8, the degrees of coincidence below the threshold are updated to a value of 0 and the areas around the degrees of coincidence above the prescribed level are rounded and stored into the temporary memory 50 (FIG. 12).

In each of the areas of a prescribed number of degrees of coincidence, the correction of degrees can also comprise setting a degree to a 1 or 0 degree of coincidence, and the degree of coincidence in each of the prescribed surrounding areas to a 1 or 0 degree of coincidence, and setting other degrees of coincidence not in the surrounding area to a 0 or 1 degree of coincidence.

Then, after the summing memory 52 is cleared of its contents, the coordinates of the results of rounding stored in the temporary memory 50 are corrected and added to the contents of the summing memory 52.

The distributions of the groups of degrees of coincidence DMH0 to DMV8 are subjected to these rounding and addition to the summing memory 52. The coordinates of the distributions of the degrees of coincidence are thereby corrected with the positional relationships among the linear images, and the distributions of the degrees of coincidence are summed up (FIG. 18).

In this process, the areas AR in which the degrees of coincidence are updated are expanded according to the respective distances from the reference linear image (FIG. 17). If high degrees of coincidence are detected in adjoining areas, a high degree of coincidence is assigned to the overlapping parts (FIG. 16).

Further from the result of this summing, the peak is detected as collation rate, and if this collate rate is higher than a prescribed level, a judgment of coincidence will be given.

Thus in this judgment of collation, it is also possible to judge the presence or absence of coincidence by detecting for each linear image coordinates at which a degree of collation above a certain level and detecting the number of combinations of coordinates satisfying the relative positional requirement among the linear images. However, if for instance five degrees each of coincidence above the prescribed level are detected for each linear image, possible combinations of 9×2 linear images will amount to the (9×2)th power of 5. Therefore, if this method is used, it will be necessary to check every one of these possible combinations whether or not it satisfies the relative positional relationship among linear images.

With this embodiment of the present invention, the collation rate can be detected for each linear image by the simple processing of merely cumulatively adding with the summing memory 52 the rounded degrees of coincidence after storing them into the temporary memory 50. The procedure of fingerprint collation is correspondingly simplified.

Further in this processing, detection of the collation rate for the cumulative sum of the degrees of coincidence of individual linear images enables the collation rate to reflect the degree of coincidence of each linear image with the reference fingerprint image. The result of fingerprint collation is thereby made reliable.

Furthermore, as each prescribed surrounding area AR is updated to a degree of coincidence above the prescribed level, the degrees of coincidence above the prescribed level can still provide a reliable result of fingerprint collation even if the fingerprint is varied by the pressure of the finger or if a child's finger grows in size. Moreover, the expansion of this area AR according to the distance from the reference linear image further improves the precision of fingerprint collation.

The configuration described above makes it possible to obtain a reliable result of fingerprint comparisons in a simple manner by detecting the distributions of the degrees of coincidence having linear images sequentially raster-scan the image to be checked, rounding each distribution of the degrees of coincidence and summing up the rounded distributions after correcting the positional relationship among the linear images.

Furthermore, in this rounding processing, by updating, with respect to degrees of coincidence above a prescribed level, the prescribed surrounding area to the degree of coincidence above the prescribed level and by expanding this area AR according to the distance from the reference linear image, a reliable result of fingerprint collation can still be obtained even if the fingerprint is varied by the pressure of the finger or if a child's finger grows in size.

What is claimed is:

1. A fingerprint comparing apparatus for judging the presence or absence of a coincidence between a first and a second image, comprising:

a plurality of individual areas cut out of said first image being sequentially displaced over said second image, with degrees of coincidence between said individual areas and said second image being sequentially detected using coordinates of said second image as a reference, and a distribution of degrees of coincidence being detected for each of said individual areas;

coordinates of the distributions of said degrees of coincidence being corrected with relative positions among said plurality of individual areas, and the distributions of the degrees of coincidence in said individual areas being summed up;

the coincidence or non-coincidence of said images being judged from a peak value of said summed distributions;

wherein degrees of coincidence between said individual areas and said second image are detected and corrected, thereby detecting the distributions of said degrees of coincidence, and wherein said degree correction comprises selection of a prescribed number of degrees of coincidence in a descending order of the degree of coincidence, setting the degrees of coincidence in a prescribed area around each of the selected degrees of coincidence to a central degree of coincidence, and setting other degrees of coincidence to a bottom level.

2. A fingerprint comparing apparatus as claimed in claim 1, wherein:

said individual areas are sequentially displaced over said second image, the degrees of coincidence are detected and corrected, thereby detecting the distributions of said degrees of coincidence, and wherein said degree correction further comprises:

sequential comparison of said degrees of coincidence with a prescribed reference level;

rounding the degrees of coincidence above said reference level; and setting the degrees of coincidence not above said reference level to a bottom level.

3. A fingerprint comparing apparatus as claimed in claim 1, wherein:

said cut-out areas are sequentially displaced over said second image, the degrees of coincidence are detected and corrected, thereby detecting the distributions of said degrees of coincidence, and said correction comprises:

sequential comparison of said degrees of coincidence with a prescribed reference level;

rounding the degrees of coincidence which are above said reference level, and setting the degrees of coincidence in each of the prescribed surrounding areas to a 1 or 0 degree of coincidence; and setting the degrees of coincidence not above said reference level to a 0 or 1 degree of coincidence.

4. A fingerprint comparing apparatus as claimed in claim 1, wherein:

said cut-out areas are sequentially displaced over said second image, the degrees of coincidence are detected and corrected, thereby detecting the distributions of said degrees of coincidence, and said correction comprises:

setting in each of said areas of a prescribed number of degrees of coincidence in the descending order of the degree of coincidence to a 1 or 0 degree of coincidence, and the degree of coincidence in each of the prescribed surrounding areas to a 1 or 0 degree of coincidence; and setting other degrees of coincidence to a 0 or 1 degree of coincidence.

5. A fingerprint comparing apparatus, as claimed in claim 2, wherein:

said correction of the coordinates of the distributions of said degrees of coincidence is executed by:

setting one of said plurality of areas as a reference area; then correcting the coordinates of the distribution of the degrees of coincidence in each of the other individual areas according to the coordinate values of each area relative to said reference area; and said prescribed area is: set so that each of said other areas expand as its distance from said reference area increases.

6. A fingerprint comparing apparatus as claimed in claim 2, wherein:

correction of the coordinates of the distributions of said degrees of coincidence is executed by:

setting one of said plurality of areas as reference area, and correcting the coordinates of the distribution of the degrees of coincidence in each of the other areas according go the coordinate values of each area relative to said reference area; and said prescribed area is:

set so that each of said other areas expand as its distance from said reference area increases.

7. A fingerprint comparing apparatus as claimed in claim 3, wherein:

correction of the coordinates of the distributions of said degrees of coincidence is executed by:

setting one of said plurality of areas as reference area, and correcting the coordinates of the distribution of the degrees of coincidence in each of the other areas according to the coordinate values of each area relative to said reference area; and said prescribed area is:

set so that each of said other areas expand as its distance from said reference area increases.

8. A fingerprint comparing apparatus as claimed in claim 4, wherein:

correction of the coordinates of the distributions of said degrees of coincidence is executed by:

setting one of said plurality of areas as reference area, and correcting the coordinates of the distribution of the degrees of coincidence in each of the other areas according to the coordinate values of each area relative to said reference area; and said prescribed area is:

set so that each of said other areas expand as its distance from said reference area increases.

9. A fingerprint comparing apparatus as claimed in claim 1, wherein:

said reference area consists of a 1-pixel linear image.

10. A fingerprint comparing apparatus for judging the presence or absence of coincidence between a first and a second image, a plurality of individual areas cut out of said first image being sequentially displaced over said second image, with degrees of coincidence between said individual areas and said second image being sequentially detected using coordinates of said second image as reference, and a distribution of degrees of coincidence being detected for each of said individual areas;

coordinates of the distributions of said degrees of coincidence being corrected with relative positions among said plurality of individual areas, and the distributions of the degrees of coincidence in said individual areas being summed up;

the coincidence or non-coincidence of said images being judged from a peak value of said summed distributions;

said cut-out areas are sequentially displaced over said second image, the degrees of coincidence are detected and corrected, thereby detecting the distributions of said degrees of coincidence, and wherein said degree correction comprises:

setting in each of said areas of a prescribed number of degrees of coincidence in a descending order of the degree of coincidence to a 1 or 0 degree of coincidence, and the degree of coincidence in each of the prescribed surrounding areas to a 1 or 0 degree of coincidence; and setting other degrees of coincidence to a 0 or 1 degree of coincidence.

11. A fingerprint comparing apparatus as claimed in claim 10, wherein:

said cut-out areas are sequentially displaced over said second image, the degrees of coincidence are detected and corrected, thereby detecting the distributions of said degrees of coincidence, and wherein said degree correction comprises:

sequential comparison of said degrees of coincidence with a prescribed reference level, rounding the degrees of coincidence above said reference level, and setting the degrees of coincidence not above said reference level to a bottom level.

12. A fingerprint comparing apparatus as claimed in claim 10, wherein:

said cut-out areas are sequentially displaced over said second image, the degrees of coincidence are detected and corrected, thereby detecting the distributions of said degrees of coincidence, and wherein said degree correction comprises:

selection of a prescribed number of degrees of coincidence in the descending order of the degree of coincidence;

setting the degrees of coincidence in a prescribed area around each of the selected degrees of coincidence to the central degree of coincidence; and setting other degrees of coincidence to a bottom level.

13. A fingerprint comparing apparatus as claimed in claim 10, wherein:

said cut-out areas are sequentially displaced over said second image, the degrees of coincidence are detected and corrected, thereby detecting the distributions of said degrees of coincidence, and said degree correction comprises:

sequential comparison of said degrees of coincidence with a prescribed reference level;

rounding the degrees of coincidence which are above said reference level, and setting the degrees of coincidence in each of the prescribed surrounding areas to a 1 or 0 degree of coincidence; and setting the degrees of coincidence not above said reference level to a 0 or 1 degree of coincidence.

14. A fingerprint comparing apparatus, as claimed in claim 11, wherein:

correction of the coordinates of the distributions of said degrees of coincidence is executed by:

setting one of said plurality of areas as reference area, and correcting the coordinates of the distribution of the degrees of coincidence in each of the other areas according to the coordinate values of each area relative to said reference area; and said prescribed area is:

set so that each of said other areas expand as its distance from said reference area increases.

15. A fingerprint comparing apparatus as claimed in claim 12, wherein:

correction of the coordinates of the distributions of said degrees of coincidence is executed by:

setting one of said plurality of areas as reference area, and correcting the coordinates of the distribution of the degrees of coincidence in each of the other areas according to the coordinate values of each area relative to said reference area; and said prescribed area is:

set so that each of said other areas expand as its distance from said reference area increases.

16. A fingerprint comparing apparatus as claimed in claim 13, wherein:

correction of the coordinates of the distributions of said degrees of coincidence is executed by:

setting one of said plurality of areas as reference area, and correcting the coordinates of the distribution of the degrees of coincidence in each of the other areas according to the coordinate values of each area relative to said reference area; and said prescribed area is:

set so that each of said other areas expand as its distance from said reference area increases.

17. A fingerprint comparing apparatus as claimed in claim 10, wherein:

Correction of the coordinates of the distributions of said degrees of coincidence is executed by:

Setting one of said plurality of areas as reference area, and correcting the coordinates of the distribution of the degrees of coincidence in each of the other areas according to the coordinate values of each area relative to said reference area; and said prescribed area is:

Set so that each of said other areas expand as its distance from said reference area increases.

18. A fingerprint comparing apparatus as claimed in claim 10, wherein:

said area consists of a 1-pixel linear image.

19. A method of fingerprint comparing which judges the presence or absence of a coincidence between a first and a second fingerprint image, comprising:

cutting a plurality of individual areas out of said first image;

sequentially displacing said individual areas over said second image;

detecting degrees of coincidence between said individual areas and said second image using coordinates of said second image as reference, detecting a distribution of said degrees of coincidence for each of said areas;

updating coordinates of the distributions of said degrees of coincidence with relative positions among said plurality of individual areas;

summing said distributions of the degrees of coincidence in said individual areas;

judging coincidence or non-coincidence of said images from a peak value of said summed distributions;

detecting and correcting degrees of coincidence between said cut out areas and said second image;

wherein said correcting further comprises:

selecting of a prescribed number of degrees of coincidence in a descending order of the degree of coincidence;

setting the degrees of coincidence in a prescribed area around each of the selected degrees of coincidence to a central degree of coincidence; and setting other degrees of coincidence to a bottom level.

20. A method of fingerprint comparing as claimed in claim 19, further comprising:

sequentially displacing said individual areas over said second image, wherein said degrees of coincidence are detected and corrected thereby detecting the distributions of said degrees of coincidence; wherein said degree correction further comprises:

sequentially comparing said degrees of coincidence with a prescribed reference level;

rounding the degrees of coincidence above said reference level; and setting the degrees of coincidence not above said reference level to a bottom level.

21. A method of fingerprint comparing as described in claim 19, wherein said correction of the coordinates of the distributions of said degrees of coincidence is executed by:

setting one of said plurality of areas as a reference area;

correcting the coordinates of the distribution of the degrees of coincidence in each of the other individual areas according to the coordinate values of each area relative to said reference area; and setting said prescribed area so that each of said other individual areas expand as their distance from said reference area increases.

* * * * *

UNITED STATES PATENT AND TRADEMARK OFFICE
CERTIFICATE OF CORRECTION

PATENT NO. : 6,175,640 B1
DATED : January 16, 2001
INVENTOR(S) : Takuya Wada

It is certified that error appears in the above-identified patent and that said Letters Patent is hereby corrected as shown below:

<u>Column 18, claim 17,</u>
Line 16, should read,

17. A fingerprint comparing apparatus as claimed in claim 10, wherein: correction of the coordinates of the distributions of said degrees of coincidence is executed by:

setting one of said plurality of areas as reference area, and correcting the coordinates of the distribution of the degrees of coincidence in each of the other areas according to the coordinate values of each area relative to said reference area; and said prescribed area is:

set so that each of said other areas expand as its distance from said reference area increases.

Signed and Sealed this

Thirteenth Day of November, 2001

*Attest:*

*Attesting Officer*

NICHOLAS P. GODICI
*Acting Director of the United States Patent and Trademark Office*